United States Patent
Chen

(10) Patent No.: US 9,476,562 B2
(45) Date of Patent: Oct. 25, 2016

(54) VEHICLE LIGHTING DEVICE

(71) Applicant: HON HAI PRECISION INDUSTRY CO., LTD., New Taipei (TW)

(72) Inventor: Po-Chou Chen, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 412 days.

(21) Appl. No.: 14/014,329

(22) Filed: Aug. 29, 2013

(65) Prior Publication Data

US 2015/0062945 A1 Mar. 5, 2015

(30) Foreign Application Priority Data

Aug. 27, 2013 (TW) .............................. 102130663 A

(51) Int. Cl.
- *F21S 8/10* (2006.01)
- *B60Q 1/00* (2006.01)
- *F21V 8/00* (2006.01)

(52) U.S. Cl.
CPC ........... *F21S 48/215* (2013.01); *B60Q 1/0052* (2013.01); *F21S 48/225* (2013.01); *F21S 48/2212* (2013.01); *F21S 48/2281* (2013.01); *G02B 6/0096* (2013.01)

(58) Field of Classification Search
CPC .. F21S 48/215; F21S 48/115; F21S 48/1352; F21S 48/1357; F21S 48/234; F21V 7/0083
USPC ........................................ 362/516, 304, 545
See application file for complete search history.

(56) References Cited

U.S. PATENT DOCUMENTS

| | | | | |
|---|---|---|---|---|
| 5,555,161 A * | 9/1996 | Roe | .................. | B60Q 3/024 116/202 |
| 6,069,440 A * | 5/2000 | Shimizu | ............. | C09K 11/7767 313/486 |
| 8,672,512 B2 * | 3/2014 | Zhou | .................. | F21K 9/135 362/255 |
| 8,746,930 B2 * | 6/2014 | Catalano | ............. | F21K 9/137 362/231 |
| 8,820,962 B2 * | 9/2014 | Kang | ................ | F21K 9/135 362/236 |
| 8,840,269 B2 * | 9/2014 | Kang | ................ | F21K 9/135 362/236 |
| 9,016,896 B1 * | 4/2015 | Roudeski | ............. | F21V 7/04 340/953 |
| 9,057,503 B2 * | 6/2015 | Catalano | ............. | F21V 13/10 |
| 9,103,520 B1 * | 8/2015 | Tessnow | ............. | B60Q 1/0058 |
| 2001/0015899 A1* | 8/2001 | Kondo | ............... | F21S 48/2287 362/543 |
| 2004/0165388 A1* | 8/2004 | Shoji | .................. | F21V 5/045 362/304 |
| 2013/0235582 A1* | 9/2013 | Breidenassel | .......... | F21K 9/135 362/241 |

* cited by examiner

*Primary Examiner* — Evan Dzierzynski
*Assistant Examiner* — Leah S Macchiarolo
(74) *Attorney, Agent, or Firm* — Zhigang Ma

(57) ABSTRACT

A vehicle lighting device includes a housing, a first receiving cavity recessed inwardly from a center of a front side of the housing, a first light source received in the first receiving cavity, an annular second receiving cavity recessed in the front side of the housing and surrounding the first receiving cavity, a second light source received in the second receiving cavity, a first envelope fixed in the front side of the housing and covering the first receiving cavity, and an annular second envelope fixed in the front side of the housing and covering the second receiving cavity. An inner face of the second receiving cavity is a bending face including a plurality of reflecting facets for reflecting light emitted from the second light source. Every two adjacent reflecting facets intersect with an angle. The second light source faces at least one reflecting facet distant from the second envelope.

11 Claims, 4 Drawing Sheets

VEHICLE LIGHTING DEVICE

BACKGROUND

1. Technical Field

The present disclosure generally relates to vehicle lighting devices, and particularly to a vehicle lighting device having a plurality of reflecting facets.

2. Description of Related Art

In recent years, due to excellent light quality and high luminous efficiency, light emitting diodes (LEDs) have increasingly been used as substitutes for incandescent bulbs, compact fluorescent lamps and fluorescent tubes as light sources of illumination devices.

A common vehicle lighting device usually includes a central light source and a second light source surrounding the central light source. The central light source and the second light source are used for radiating light, thereby achieving a high light illumination. However, the light will be output directly without being adjusted. As such, a luminous flux of the light of the common vehicle lighting device employing a light emitting diode (LED) in a predetermined outputting area usually can not achieve the rules cause of low utilization of light.

Therefore, what is needed is to provide an improved vehicle lighting device which can overcome the above shortcomings.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure.

DETAILED DESCRIPTION

Reference will now be made to the drawings to describe the vehicle lighting device, in detail.

Figure 1:
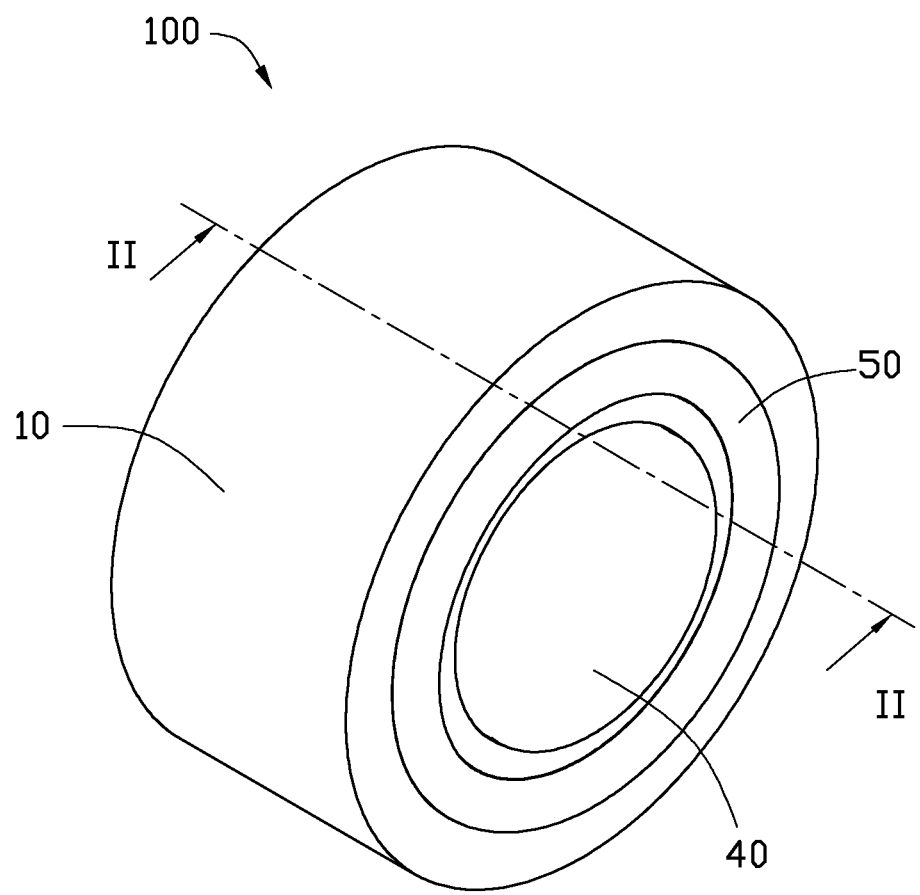
FIG. 1 is a schematic view of a vehicle lighting device in accordance with a first embodiment of the present disclosure.
Figure 2:
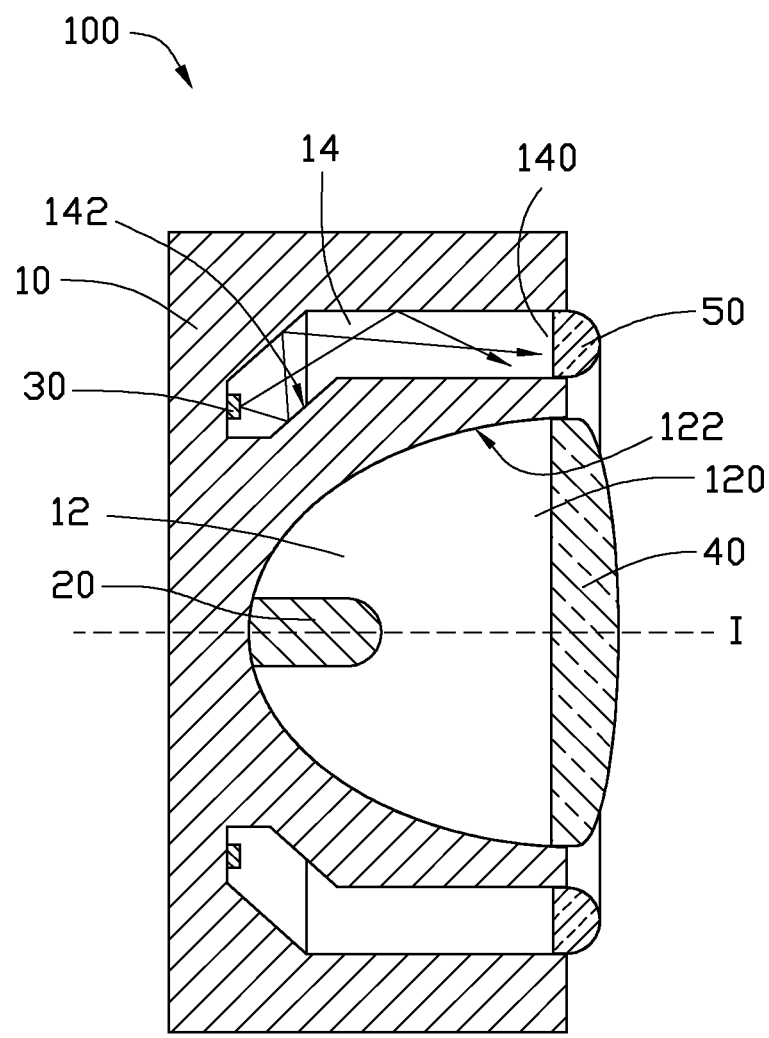
FIG. 2 is a cross-sectional view of the vehicle lighting device of FIG. 1, taken along a line II-II thereof.

Referring to FIGS. 1-2, a vehicle lighting device 100 according to a first embodiment is illustrated. The vehicle lighting device 100 includes a housing 10, a first receiving cavity 12 recessed inwardly from a center of a front side of the housing 10, a first light source 20 received in the first receiving cavity 12, an annular second receiving cavity 14 recessed in the front side of the housing 10 and surrounding the first receiving cavity 12, a second light source 30 received in the second receiving cavity 14, a first envelope 40 fixed in the front side of the housing 10 and covering the first receiving cavity 12, and an annular second envelope 50 fixed in the front side of the housing 10 and covering the second receiving cavity 14.

The housing 10 is integrally made of metal or composite materials. In this embodiment of disclosure, the housing 10 is made of aluminum.

The first receiving cavity 12 is dome-like, and has a first opening 120. The first receiving cavity 12 has a central axis I, and the first receiving cavity 12 is axisymmetric relative to the central axis I. The first light source 20 is positioned on the central axis I. An inner face of the first receiving cavity 12 is a reflecting face 122 for reflecting light emitted from the first light source 20. The reflecting face 120 is ellipsoidal, Parabolic, spherical or freeform. At least part of the light emitted from the first light source 20 is reflected by the reflecting face 122, and exits outwardly from the first receiving cavity 12 though the first opening 120.

The second receiving cavity 14 is an annular slot, and has an annular second opening 140. An inner face of the second receiving cavity 14 is a bending face including a plurality of reflecting facets 142 for reflecting light emitted from the second light source 30. Every two adjacent reflecting facets 142 intersect with an angle. The second light source 30 faces at least one reflecting facet 142 distant from the second opening 140. The light emitted from the second light source 30 is reflected by the reflecting facets 142 multiple times, and exits outwardly from the second receiving cavity 14 through the second opening 140. In the embodiment of this disclosure, each reflecting facet 142 is planar, alternatively, each reflecting facet is curved.

The first light source 20 is halogen light source, xenon light source or LED light source.

The second light source 30 is LED light source, and includes a plurality of LEDs. The LED is made of GaN, InGaN, AlInGaN or other suitable semiconductor materials. The LEDs are evenly arranged on one reflecting facet 142 distal from the second opening 140 of the second receiving cavity 14.

The first envelope 40 is integrally made of transparent materials such as PC (polycarbonate), PMMA (polymethyl methacrylate) or optical glass. The first envelop 40 is fixed in the first receiving cavity 12 corresponding to the first opening 120, whereby the first receiving cavity 12 is sealed by the first envelope 40. The light emitted from the first light source 20 projects outwardly through the first envelope 40.

The annular second envelope 50 is integrally made of transparent materials such as PC (polycarbonate), PMMA (polymethyl methacrylate) or optical glass. The annular second envelop 50 is fixed in the second receiving cavity 14 corresponding to the second opening 140, whereby the second receiving cavity 14 is sealed by the second envelope 50. The light emitted from the second light source 30 projects outwardly through the second envelope 50.

Figure 3:
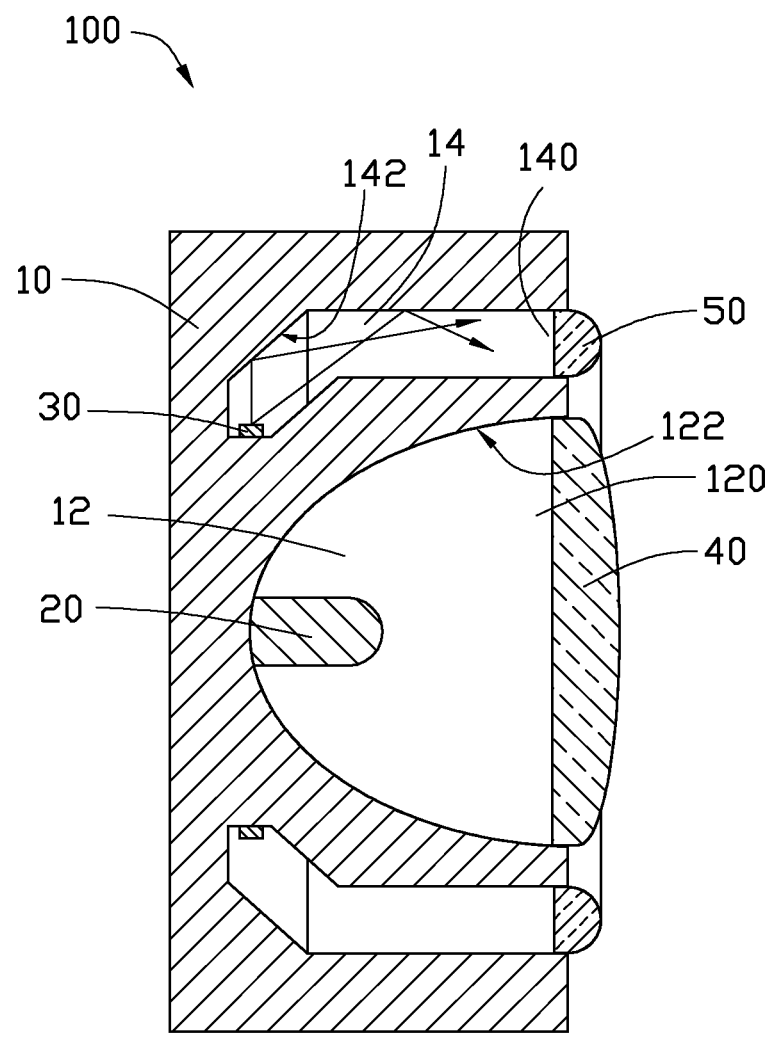
FIG. 3 is a schematic view of a vehicle lighting device in accordance with a second embodiment of the present disclosure.

Referring to FIG. 3 also, a vehicle lighting device 100 according to a second embodiment is illustrated. The difference between the vehicle lighting device 100 of the first embodiment and that of the second embodiment is position of the second light source 30. In this embodiment of the disclosure, light paths of the light emitted from the second light source 30 transmits between the reflecting facets 142 are changed relative to those in the first embodiment of the disclosure.

Figure 4:
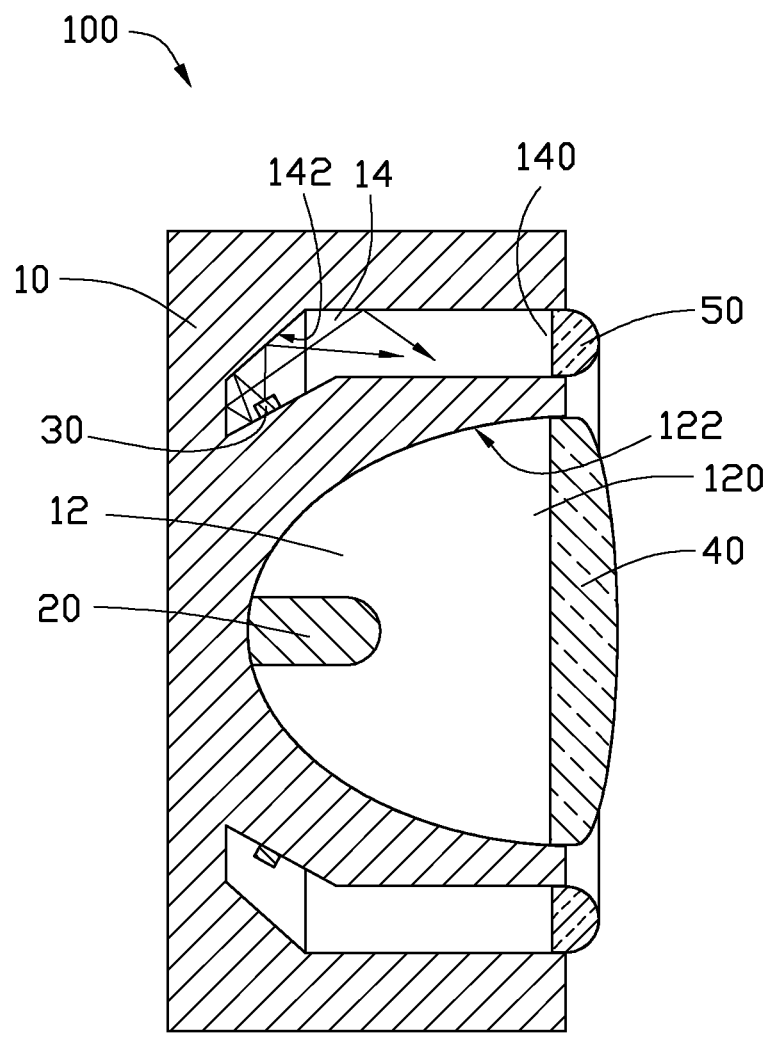
FIG. 4 is a schematic view of a vehicle lighting device in accordance with a third embodiment of the present disclosure.

Referring to FIG. 4 also, a vehicle lighting device 100 according to a third embodiment is illustrated. The differences between the vehicle lighting device 100 of the first embodiment and that of the third embodiment are position of the second light source 30 and the reflecting facets 142. In this embodiment of the disclosure, light paths of the light emitted from the second light source 30 transmits between the reflecting facets 142 are changed relative to those in the first embodiment of the disclosure.

It is to be understood that the above-described embodiments are intended to illustrate rather than limit the disclosure. Variations may be made to the embodiments without departing from the spirit of the disclosure as claimed. The above-described embodiments illustrate the scope of the disclosure but do not restrict the scope of the disclosure.

What is claimed is:

1. A vehicle lighting device, comprising:
a housing;
a first receiving cavity recessed inwardly from a center of a front side of the housing;
a first light source received in the first receiving cavity;
an annular second receiving cavity recessed in the front side of the housing and surrounding the first receiving cavity;
a second light source received in the second receiving cavity;
a first envelope fixed in the front side of the housing and covering the first receiving cavity; and
an annular second envelope fixed in the front side of the housing and covering the second receiving cavity;
wherein an inner face of the second receiving cavity is a bending face comprising comprises a plurality of reflecting facets for reflecting light emitted from the second light source, every two adjacent reflecting facets intersect with an angle, and the second light source faces at least one reflecting facet distant from the second envelope, a cross section of the first receiving cavity is a arc-shaped, an inner diameter of the first receiving cavity is gradually increased from bottom to top, the second light source surrounds the first light source.

2. The vehicle lighting device of claim 1, wherein the second light source is arranged on one reflecting facet distant from the second envelope.

3. The vehicle lighting device of claim 1, wherein each reflecting facet is planar.

4. The vehicle lighting device of claim 1, wherein light emitted from the second light source is reflected by the reflecting facets multiple times, and exits outwardly from the second receiving cavity through the second envelope.

5. The vehicle lighting device of claim 1, wherein the housing is made of metal or composite materials.

6. The vehicle lighting device of claim 1, wherein the first receiving cavity is dome-like a concave surface, and an inner face of the first receiving cavity is a reflecting face for reflecting light emitted from the first light source.

7. The vehicle lighting device of claim 6, wherein the first receiving cavity has a central axis, and the first receiving cavity is axisymmetric relative to the central axis.

8. The vehicle lighting device of claim 6, wherein the reflecting face is ellipsoidal, Parabolic, spherical or freeform.

9. The vehicle lighting device of claim 1, wherein the first light source is halogen light source, xenon light source or LED light source.

10. The vehicle lighting device of claim 1, wherein the second light source comprises a plurality of LEDs, and the LEDs are arranged on at least one reflecting facet.

11. The vehicle lighting device of claim 10, wherein the LED is made of GaN, InGaN, AlInGaN or other suitable semiconductor materials.

* * * * *